United States Patent
Salven et al.

(10) Patent No.: US 7,338,088 B2
(45) Date of Patent: Mar. 4, 2008

(54) CONNECTOR

(75) Inventors: Owe Salven, Uppsala (SE); Mattias Vangbo, Bälinge (SE); Patrik Källback, Uppsala (SE); Mårten Stjernström, Danderyd (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 0 days.

(21) Appl. No.: 10/493,011

(22) PCT Filed: Oct. 15, 2002

(86) PCT No.: PCT/EP02/11531

§ 371 (c)(1),
(2), (4) Date: Sep. 17, 2004

(87) PCT Pub. No.: WO03/036103

PCT Pub. Date: May 1, 2003

(65) Prior Publication Data

US 2005/0012327 A1    Jan. 20, 2005

(30) Foreign Application Priority Data

Oct. 19, 2001   (GB)   ................................ 0125074.5

(51) Int. Cl.
    *F16L 39/00*   (2006.01)
(52) U.S. Cl. .............................. 285/124.3; 285/124.5; 285/342; 285/343; 285/332.1
(58) Field of Classification Search .. 285/124.1–124.5, 285/342, 332, 343, 332.1
See application file for complete search history.

(56) References Cited

U.S. PATENT DOCUMENTS

| 2,846,246 A | * | 8/1958 | Peras | 285/124.3 |
|---|---|---|---|---|
| 3,079,992 A | * | 3/1963 | Otten et al. | 165/76 |
| 3,377,087 A | * | 4/1968 | Samerdyke et al. | 285/14 |
| 3,469,863 A | * | 9/1969 | Riester et al. | 285/124.4 |
| 3,530,881 A |   | 9/1970 | Tanner et al. | |
| 3,880,452 A | * | 4/1975 | Fields | 285/148.23 |
| 3,948,315 A | * | 4/1976 | Powell | 165/70 |
| 4,083,702 A | * | 4/1978 | Hartigan et al. | 96/106 |
| 4,182,184 A | * | 1/1980 | Bakalyar et al. | 73/864.87 |
| 4,258,977 A | * | 3/1981 | Lukas et al. | 385/60 |
| 4,345,786 A | * | 8/1982 | Egert | 285/124.4 |
| 4,394,263 A | * | 7/1983 | Dosch et al. | 210/198.2 |
| 4,529,230 A | * | 7/1985 | Fatula, Jr. | 285/341 |
| 4,754,993 A | * | 7/1988 | Kraynick | 285/124.4 |

(Continued)

FOREIGN PATENT DOCUMENTS

JP          11305073   * 11/1999

*Primary Examiner*—David Bochna
(74) *Attorney, Agent, or Firm*—Dwayne Bentley

(57) ABSTRACT

A connector is provided for selectively coupling one or more lines or wires (19', 19") to a receiving and/or transporting device (27). The connector comprises at least one line or wire receiving ferrule (7) having a plurality of line and/or wire receiving holes (17'-17") each capable of receiving one of said one or more lines or wires (19', 19"), wherein said connector further comprises a body (3) for receiving said ferrule (7) and clamping means (9, 11) for exerting a force on said ferrule (7) in order to simultaneously exert a line or wire clamping force on all said line and/or wire receiving holes (17'-17"). In this way all the fluid lines or wires can be clamped at the same time.

22 Claims, 2 Drawing Sheets

U.S. PATENT DOCUMENTS

| | | | |
|---|---|---|---|
| 4,787,656 A | | 11/1988 | Ryder |
| 4,804,208 A | * | 2/1989 | Dye .............................. 285/26 |
| 4,900,065 A | * | 2/1990 | Houck .......................... 285/73 |
| 4,995,646 A | * | 2/1991 | Johnston et al. ......... 285/124.3 |
| 5,234,235 A | * | 8/1993 | Worden ................... 285/334.4 |
| 5,253,520 A | * | 10/1993 | Drexel et al. ................. 73/202 |
| 5,288,113 A | * | 2/1994 | Silvis et al. ................ 285/342 |
| 5,379,790 A | * | 1/1995 | Bruce et al. .................... 137/1 |
| 5,482,628 A | * | 1/1996 | Schick .................... 210/198.2 |
| 5,669,639 A | * | 9/1997 | Lawrence ................... 292/175 |
| 6,056,331 A | * | 5/2000 | Benett et al. ................ 285/343 |
| 6,267,143 B1 | * | 7/2001 | Schick .................. 137/625.11 |
| 6,273,478 B1 | | 8/2001 | Benett et al. |
| 6,575,501 B1 | * | 6/2003 | Loy, Jr. ...................... 285/342 |

* cited by examiner

CONNECTOR

CROSS REFERENCE TO RELATED APPLICATION

This application is a filing under 35 U.S.C. §371 and claims priority to international patent application number PCT/EP02/11531 filed Oct. 15, 2002, published on May 1, 2003 as WO03/036103, and to foreign application number 0125074.5 filed in Great Britain on Oct. 19, 2001, the entire disclosures of which are hereby incorporated by reference.

1. Field of the Invention

The present invention relates to devices of the type mentioned in the preambles of the independent claims.

2. Prior Art

Much effort is being expended on producing microfluidic devices for analysing small volumes of liquids. Many companies are producing so-called "labs on a chip". Such a lab on a chip typically comprises a disk or block (a "chip") made of an inert transparent material, e.g. a plastic, in which microchannels are formed. Samples of substances to be analysed can be inputted to these microchannels and these microchannels lead to chambers where the samples can be reacted with reagents. The results of the reactions may be observed through the transparent disc or block walls and/or the products of the reactions may be output from the chip for further processing or analysis. Thus there is a need to connect the chips to input and output interfaces. This poses many problems as the microchannels are small, typically a few micrometers in width or diameter, and it can be difficult to align input devices with them. Additionally some of the input devices, e.g. liquid chromatographs, work at high pressures and it has proven to be difficult to prevent leakage when using such input devices. This is particularly true when very narrow diameter silica tubes are used as the pressure drop over them is very high and therefore pressures are used which are tens or hundreds of times greater than atmospheric pressure.

Similar problems occur when connecting pneumatic systems and hydraulic systems. Additionally, it is often difficult to satisfactorily connect electrical wires, optical cables and the like to devices such as fluidic chips.

SUMMARY OF THE INVENTION

According to the present invention, at least some of the problems with the prior art are solved by means of a connector device having the features present in the characterising part of claim 1 and a connector ferrule having the features mentioned in the characterising part of claim 7. Further improvements are obtained by devices having the features mentioned in the dependent claims.

BRIEF DESCRIPTION OF THE FIGURES

The following figures show an illustrative, non-limiting example of an embodiment of the present invention in which.

DETAILED DESCRIPTION OF EMBODIMENTS ILLUSTRATING THE INVENTION

In this example of an embodiment of the invention, it will be illustrated how fluid transporting capillaries can be connected to a fluid receiving and transporting chip. It should be noted that the present invention is not restricted to use such capillaries and chips but may also be used for connecting electrical wires to a component or other wires, fibre optic wires to a component or other wires, hydraulic lines to a component or other lines, etc.

Figure 1:
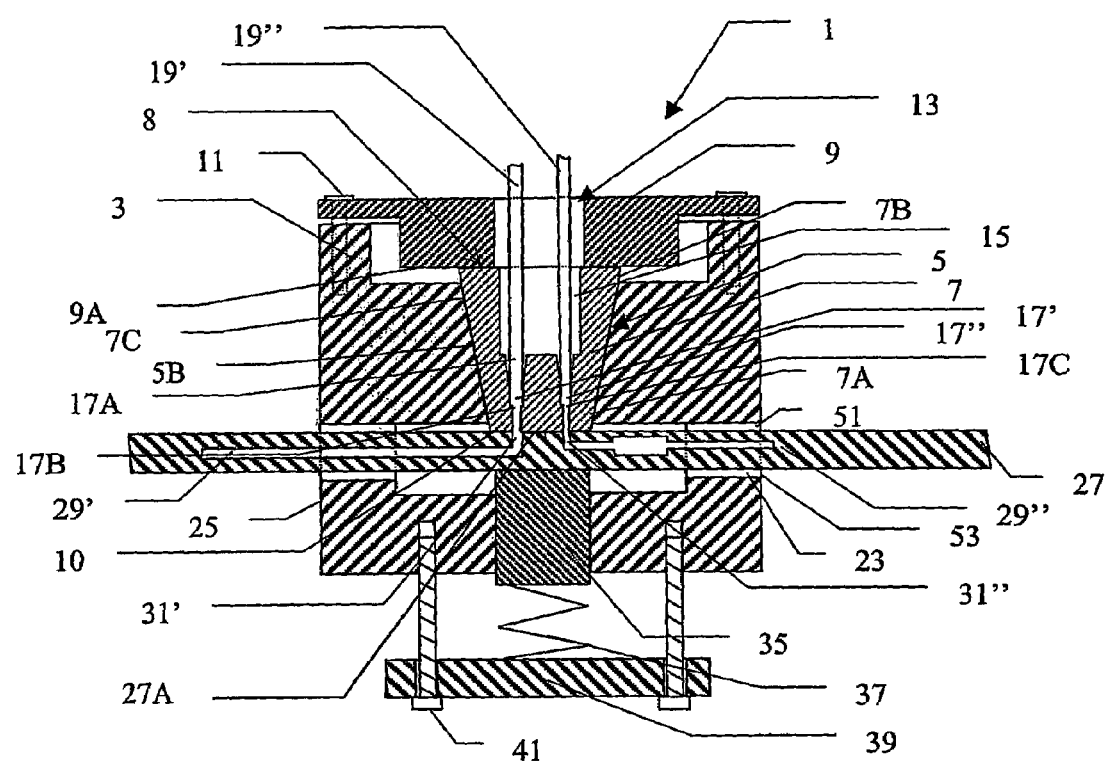
FIG. 1 shows a lateral cross-section of a first embodiment of a connector in accordance with the present invention.
Figure 2:
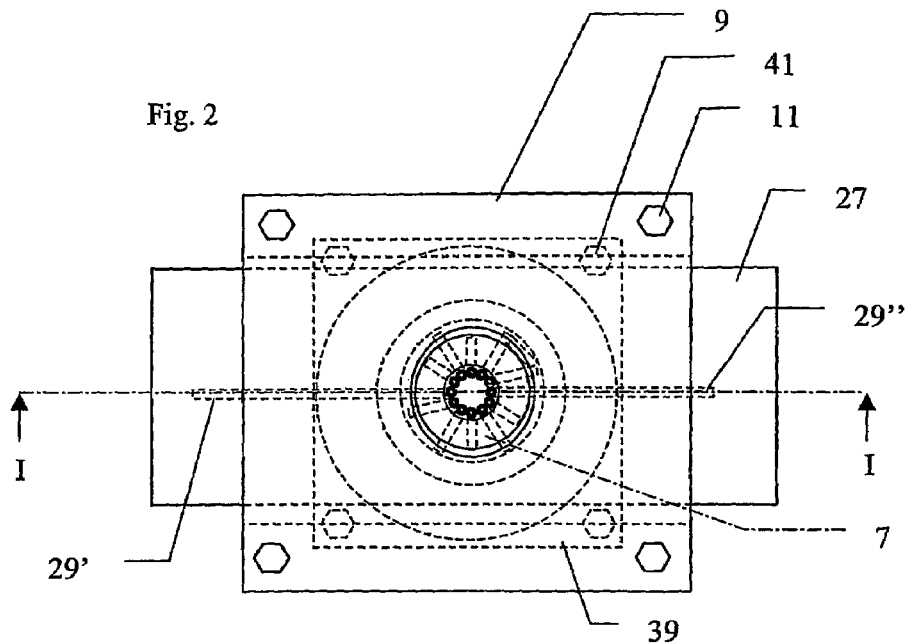
FIG. 2 shows a view from above of the connector of FIG. 1.

A connector 1 in accordance with the present invention is shown in section in FIG. 1 and a view from above of the connector of FIG. 1 is shown in FIG. 2.

Connector 1 has a cylindrical connector body 3 with an tapered axial through hole 5. Body 3 is made of any suitable material, such as stainless steel, which is able to withstand the forces exerted during assembly and operation of the connector. A connector ferrule 7 in the shape of a truncated cone and adapted to fit into through hole 5 with its narrow end 7A extending through the narrow end of through hole 5 is positioned in through hole 5. Ferrule 7 is designed to be less rigid than the body 3, and preferably is made of a machinable plastic, for example PEEK (essentially polyetheretherketone) or the like. Ferrule 7 is retained in connector body 3 by a ferrule presser plate 9 which can be attached by attaching means such as bolts or screws 11 onto connector body 3 at the end where the though hole 5 is widest. Ferrule presser plate 9 has a pressure surface 9A which faces towards, and is intended to fit and press against, the end surface 8 of the widest end 7B of connector ferrule 7. The force that presses connector ferrule 7 into through hole 5 can be adjusted by adjusting the force which the attaching means 11 exerts on pressure plate 9. Ferrule presser plate 9 is designed to be more rigid than the connector ferrule 7. As ferrule presser plate 9 is bolted towards hole 5, its pressure surface 9A comes into contact with the widest end surface 7B of connector ferrule 7 and consequently it forces the tapered surface 7C of connector ferrule 7 against the tapered portion 5B of through hole 5. Connector ferrule 7 can thereby be compressed between the tapered portion 5B of through hole 5 and ferrule presser 9. As both body 3 and presser plate 9 are both more rigid than ferrule 7 then ferrule 7 deforms first under the compression forces.

Ferrule presser plate 9 has a central opening 13, and ferrule 7 has a cylindrical cavity 15 at its widest end. This cavity 15 is substantially concentric with the central opening 13 in ferrule presser plate 9. The lower end of cavity 15 contains a plurality of capillary receiving through holes 17', 17"-17$^N$ (only two of which are shown in FIG. 1 for the sake of clarity) that extend from the base of cavity 15 to the bottom surface of ferrule 7. Capillary receiving through holes 17', 17"-17$^N$ are preferably equidistantly spaced apart and arranged in a circle centred on the centreline of ferrule 7, or arranged in another regular pattern, so that when ferrule 7 is compressed then the forces that act on each capillary receiving through holes 17', 17"-17$^N$ are similar. The upper ends (i.e. the ends which open out into the cavity 15) 17A of capillary receiving through holes 17', 17"-17$^N$ are tapered so that they become narrower towards the bottom and at approximately half way along their depth they become cylindrical, so that the lower ends 17B of capillary receiving through holes 17 are cylindrical. The diameter of at least a portion of the lower ends 17B of capillary receiving through holes 17 when uncompressed is substantially the same as, or greater than, the diameter of the fluid tubing such as capillaries 19', 19"-19$^M$ with which the connector 1 is intended to be used, e.g. 0.36 mm if silica capillaries are used or 0.18 mm if micro-silica capillaries are used, so that the capillaries can be inserted a distance into the lower ends 17B. As the clamping of the capillaries by the ferrule takes place in this portion of the lower ends 17B, preferably the diameter of this portion should be sufficiently large so that the capillaries can be easily inserted into this portion and should be sufficiently small such that even when the ferrule is unclamped the capillaries are lightly held in the ferrule in order to prevent them being accidentally detached during handling of the ferrule. It is possible to provide a capillary receiving though hole with a stepped and/or tapering diameter with an upper portion with a diameter of about 0.36 mm and which is stepped and/or tapered down to a diameter of about 0.18 mm so that the a ferrule could be used with both 0.36 mm diameter capillaries and 0.18 mm diameter microcapillaries. Optionally, the bottom of each capillary receiving through hole 17 may be provided with a ledge 17C which prevents the passage of capillaries. The height of the ledge should be chosen to prevent the capillaries 19', 19" from being inserted too far into through holes 17', 17"-17$^N$ and projecting out of the narrow, bottom surface 10 of ferrule 7.

In order to make the connector as small as possible, the distance between centres of the capillary receiving through holes 17', 17"-17$^N$ can be small, for example of the order of 0.5 mm if silica capillaries with an outside diameter of 0.36 mm are used and 0.25 mm if micro-silica capillaries (outside diameter 0.18 mm) are used. The tapered upper ends 17A of capillary through holes 17 act as funnels and make it easier to thread the capillaries 19', 19" in the capillary receiving through holes 17. As ferrule presser plate 9 pushes connector ferrule 7 down into through hole 5, connector ferrule 7 is compressed between ferrule presser 9 and the tapered portion 5B of through hole 5. As ferrule 7 is less rigid than body 3 which has the tapered portion 5B of through hole 5 formed in it, the tapered lower end 7B of connector ferrule 7 deforms. One of the few directions in which the material can deform is towards the inside of the capillary receiving through holes 17', 17"-17$^N$. This causes a radial force towards the centre of each capillary receiving through hole 17', 17"-17$^N$. This results in a clamping force on the capillaries 19', 19"-19$^M$ introduced into the through holes 17', 17"-17$^N$. This clamping force can be increased by clamping ferrule presser 9 closer to through hole 5 and can easily be enough to form a fluid tight seal which can resist over 1000 bar—a pressure which has been difficult to achieve in prior art connectors for use in high pressure liquid chromatography, mass spectrometry and electrophoresis and the like. When the capillary receiving holes are arranged symmetrically, for example as shown in FIG. 2, the clamping force on each capillary is substantially equal.

Connector body 3 is provided with slots 23 in its side walls 25 in order to allow a fluid receiving and/or transporting device such as a chip 27 to be placed in contact with the end surface 10 of the narrow end 7A of connector ferrule 7. Chip 27 is provided with microchannels 29', 29" which are connected to openings 31', 31"-31$^M$ in the top surface 27A of chip 27. In a preferred embodiment of the present invention the number of openings 31', 31"-31$^M$ preferably is equal to the number of capillary receiving through holes 17', 17"-17$^N$ and the openings 31', 31'-31$^M$ are positioned so that they can all be simultaneously aligned with capillary receiving through holes. It is also conceivable to have more openings than capillaries and vice versa. Preferably connector ferrule 7 and chip 27 are provided with complementing guide pins and holes (not shown), or co-operating guide surfaces in order to facilitate and ensure correct alignment. Alternatively, the through holes 17 may be made without ledges 17C and the end of at least one capillaries allowed to project out of the bottom of at least one through hole in order to act as a guide pin.

In order to provide a sealing force between the capillary receiving through holes 17', 17"-17$^N$ and openings 31'-31$^M$, chip 27 is supported on a movable support plate 35. Support plate 35 is positioned on the opposite side of the chip to the connector ferrule 7 and preferably the face of support plate 35 in contact with the chip has a shape and dimensions similar which are adapted the face of the ferrule 7 in contact with the opposite face of the chip and is positioned directly underneath the ferrule such that no damaging stress concentrations are formed in the chip when it is clamped between the ferrule 7 and support plate 35. The support plate 35 is provided with compression force producing means such as a spring 37 positioned between support plate 35 and a movable compression plate 39, and means such as bolts 41 for moving the compression plate 39 towards or away from support plate 35. Bolts 41 can be used to adjust the force that support plate exerts on chip 27—moving compression plate 39 closer to chip 27 increases the force between chip 27 and connector ferrule 7 and vice versa. The spring 37 allows the force exerted by the bolts 41 to be finely controlled. The slots 23 are deeper than the thickness of a chip 27 so that when ferrule 7 and support plate are clamping a chip 27 in its working position then chip 27 is not in contact with any part of body 3. In other words there is a gap 51 between the upper surface of chip 27 and the upper interior surfaces of slots 23 and a gap 53 between the bottom surface of chip 27 and the lower interior surfaces of slots 23. This means that chip 27 is supported by ferrule 7 and support plate 35 which maximises the clamping forces to where they are needed and prevents the occurrence of asymmetric clamping forces which could otherwise occur if chip 27 came into contact with the side walls 25. Support plate 35 and compression plate 39 could be made of a transparent material in order to facilitate alignment of the components and to allow easy visual checking of the alignment.

Ferrule 7 is preferably provided with means such as a key-way and key or projections adapted to fit in corresponding depressions in connector body 3 in order to for preventing it from rotating once it has been placed in body 3, in order to prevent capillaries from becoming twisted and to ensure that the capillaries are connected to the intended opening on the chip when in use. This can be achieved in many different ways, for example by making it asymmetric, e.g. by providing a projecting stub (not shown), and by providing body 3 with a complementary recess (not shown), so that ferrule 7 can be held fixed against rotation with respect to body 3.

A connector in accordance with the present invention can be assembled in the following way: the operator threads the required number of capillaries 19'-19$^M$ through the central opening 13 of ferrule presser plate 9. A first capillary 19' is then introduced into cavity 15 of connector ferrule 7, fed into the tapered upper end 17A of a first through hole 17' and pushed approximately all the way into the lower end 17B of the through hole 17' until it reaches the ledge 17C near the bottom of the through hole 17'. This is repeated for a second capillary and a second through hole, until all the capillaries 19'-19$^M$ have been mounted in their respective through holes 17'-17$_N$. The connector ferrule 7 is then positioned in the through hole 5 with tapered bottom end 7B located in the tapered lower end 5B of through hole 5. The ferrule presser plate 9 is positioned on top of connector ferrule 7 and bolts 11 tightened towards body 3 so that ferrule 7 is pressed into the tapered bottom end 5B of through hole 5 so that it deforms enough such that the through holes 17', 17"-17$^N$ become narrower and grip the capillaries 19'-19$^M$. A chip 27 can then be inserted through slots 23 and aligned with its openings 31', 31"-31$^M$ each directly aligned with one of the through holes 17', 17"-17$^N$. Bolts 41 can then be tightened until chip 27 is in contact with the narrow end surface 10 of ferrule 7. Further tightening of bolts 11 and/or 41 will increase the sealing force between narrow end surface 10 and the chip 27.

It is conceivable to provide a connector in accordance with the present invention in which the ferrule presser plate is provided with a plurality of axial guide holes for capillaries instead of a central cavity. Each guide hole would have an outlet at the bottom of the ferrule presser plate and the outlet would be arranged to align with capillary receiving through holes in the connector ferrule. The connector ferrule and ferrule presser plate could be provide with co-operating alignment means such as a projection on one of these components which fits into a recess on the other component in order to ensure correct alignment While the embodiment of the present invention illustrated in the figures depicts a connector in which the connector ferrule and the chip have flat mating surfaces, it is of course possible to use other surface shapes which can seal against each other. For example, a connector ferrule can have a concave surface and a chip a matching convex surface (or a surface which becomes convex when compressed during use), or vice versa.

Additionally, it is also possible to use a plurality of ferrules in one connector body in order to connect fluid lines to a plurality of chips simultaneously, or to connect fluid lines to a plurality of regions on a single chip simultaneously.

Additionally, it may be advantageous to provide the connector ferrule with a narrow end surface which, when unloaded, is concave from its centre to the radial distance corresponding to the part of the through holes 17', 17"-17N which is nearest the centre in order to relieve stress at the interface between the chip and the connector ferrule when in use.

Figure 3A:
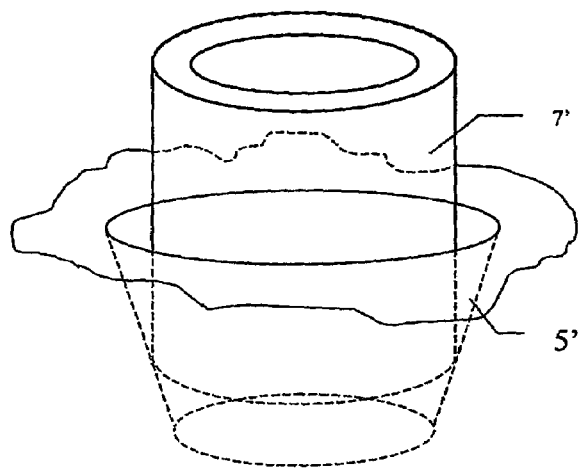
FIGS. 3a) and 3b) show schematically other shapes for connector bodies and ferrules in accordance with the present invention.
Figure 3B:
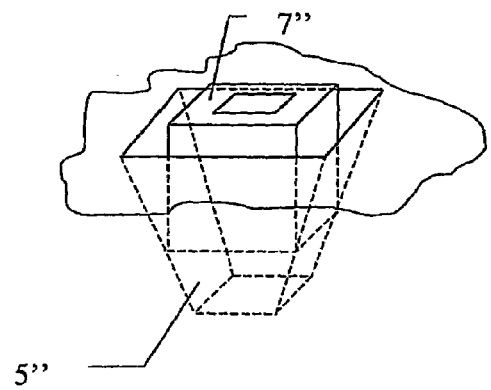

Furthermore, it is not necessary that the through hole in the connector body and the ferrule have matching tapered surfaces—it is conceivable to use a cylindrical ferrule 7' in a tapered hole 5' as shown schematically in FIG. 3a). It is also conceivable to use a ferrule 7" with a quadratic cross-section in a tapered quadratic hole 5" as shown schematically in FIG. 3b). With the add of the principle illustrated by the above examples, other complementary shapes for the hole and ferrule which can produce a compression force on the ferrule as it is clamped are readily conceivable to the skilled person.

While the invention ahas been illustrated by am embodiment in which only fluid lines are held in the ferrule, it is conceivable to provide the ferrule with electrical and/or optical wire receiving holes in addition to, or instead of, fluid line receiving holes. This would allow the simultaneous connection of electrical and optical circuits.

The above mentioned example of conceivable embodiments are intended to illustrate the present invention and are not intended to limit the scope of protection claimed by the following claims.

What is claimed is:

1. A connector (1), for selectively coupling one or more of input and/or output lines (19', 19") and/or wires to a receiving and/or transporting device (27), said connector consisting of at least one line and/or wire receiving ferrule (7), said ferrule (7) having a plurality of line and/or wire receiving holes (17'-17") capable of receiving one of said one or more lines or wires (19', 19"), a body (3) for receiving said ferrule (7), said body (3) having one single axial through hole (5) with a tapered portion (5B) into which said ferrule is being pressed by clamping means (9, 11) such that an axial force is exerted on said ferrule (7), wherein said connector body (3) is more rigid than said ferrule (7) and therefore the force exerted on said ferrule (7) makes the ferrule (7) deform such that all said line and/or wire receiving holes (17'-17") are simultaneously, radially compressed to exert a line and/or wire clamping force on all said line and/or wire receiving holes (17'-17") and wherein said clamping force forms a fluid tight seal wherein the body (3) is configured to allow a fluid receiving device (27) to be placed in contact the ferrule (7) and wherein the body (3) includes a plurality of slots (23).

2. The connector of claim 1, wherein said ferrule (7) is made of PEEK.

3. The connector of claim 1, wherein a portion of each of said line and/or wire receiving holes (17'-17") has a diameter of 0.36 mm.

4. The ferrule of claim 3, wherein the lower ends (17B) of said line and/or wire receiving holes (17'-17") are cylindrical.

5. The ferrule of claim 3, wherein said line and/or wire receiving holes (17'-17") are arranged symmetrically in said ferrule (7).

6. The connector of claim 1, wherein a portion of each of said line and/or wire receiving holes (17'-17") has a diameter of 0.18 mm.

7. The ferrule for use in the connector of claim 1, wherein said ferrule (7) is formed as a truncated cone or another truncated tapered body and it contains a plurality of line and/or wire receiving holes (17'-17").

8. The ferrule of claim 7, wherein upper ends (17A) of said line and/or wire receiving holes (17'-17") are tapered so that they become narrower towards the bottom.

9. The connector of claim 1, wherein the fluid tight seal is configured to resist a pressure of over 1000 bar.

10. The connector of claim 1, wherein the body (3) is configured to allow a transporting device (27) to be placed in contact with the ferrule (7).

11. The connector of claim 1, wherein the fluid receiving and/or transporting device is chip (27).

12. A connector (1), for selectively coupling one or more of input and/or output lines (19', 19") and/or wires to a receiving and/or transporting device (27), said connector consisting of at least one line and/or wire receiving ferrule (7), said ferrule (7) having a plurality of line and/or wire receiving holes (17'-17") capable of receiving one of said one or more lines or wires (19', 19"), a body (3) for receiving said ferrule (7), said body (3) having one single axial through hole (5) with a tapered portion (5B) into which said ferrule is being pressed by clamping means (9, 11) such that an axial force is exerted on said ferrule (7), wherein said connector body (3) is more rigid than said ferrule (7) and therefore the force exerted on said ferrule (7) makes the ferrule (7) deform such that all said line and/or wire receiving holes (17'-17") are simultaneously, radially compressed to exert a line and/or wire clamping force on all said line and/or wire receiving holes (17'-17") and wherein said clamping force forms a fluid tight seal wherein the body (3) includes a plurality of side walls (25) with a plurality of slots (23), wherein the plurality of side walls (25) are configured to allow a fluid receiving and/or transporting device to be placed in contact with the ferrule (7).

13. A connector (1), for selectively coupling one or more of input and/or output lines (19', 19") and/or wires to a receiving and/or transporting device (27) said connector consisting of at least one line and/or wire receiving ferrule (7), said ferrule (7) having a plurality of line and/or wire receiving holes (17'-17") capable of receiving one of said one or more lines or wires (19', 19"), a body (3) for receiving said ferrule (7), said body (3) having one single axial through hole (5) with a tapered portion (5B) into which said ferrule is being pressed by clamping means (9, 11) such that an axial force is exerted on said ferrule (7), wherein said connector body (3) is more rigid than said ferrule (7) and therefore the force exerted on said ferrule makes the ferrule deform such that all said line and/or wire receiving holes (17'-17") are simultaneously, by means of the tapered portion (5B) radially compressed to exert a line and/or wire clamping force on all said line and/or wire receiving holes (17'-17") wherein said clamping force forms a fluid tight seal and wherein the body (3) includes a plurality of side walls (25) with a plurality of slots (23), wherein the plurality of side walls (25) are configured to allow a fluid receiving and/or transporting device to be placed in contact with the ferrule (7).

14. The connector of claim 13, wherein said ferrule (7) is made of PEEK.

15. The connector of claim 13, wherein a portion of each of said line and/or wire receiving holes (17'-17") has a diameter of 0.36 mm.

16. The ferrule of claim 15, wherein the lower ends (17B) of said line and/or wire receiving holes (17'-17") are cylindrical.

17. The ferrule of claim 15, wherein said line and/or wire receiving holes (17'-17") are arranged symmetrically in said ferrule (7).

18. The connector of claim 13, wherein a portion of each of said line and/or wire receiving holes (17'-17") has a diameter of 0.18 mm.

19. The ferrule for use in the connector of claim 13, wherein said ferrule (7) is formed as a truncated cone or another truncated tapered body and it contains a plurality of line and/or wire receiving holes (17'-17").

20. The ferrule of claim 19, wherein upper ends (17A) of said line and/or wire receiving holes (17'-17") are tapered so that they become narrower towards the bottom.

21. The connector of claim 13, wherein the fluid tight seal is configured to resist a pressure of over 1000 bar.

22. The connector of claim 13, wherein the fluid receiving and/or transporting device is a chip (27).

* * * * *